United States Patent
Kim et al.

(10) Patent No.: US 11,373,656 B2
(45) Date of Patent: *Jun. 28, 2022

(54) SPEECH PROCESSING METHOD AND APPARATUS THEREFOR

(71) Applicant: LG ELECTRONICS INC., Seoul (KR)

(72) Inventors: Ye Jin Kim, Seoul (KR); Hyun Yu, Seoul (KR); Byeong Ha Kim, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 217 days.

This patent is subject to a terminal disclaimer.

(21) Appl. No.: 16/704,988

(22) Filed: Dec. 5, 2019

(65) Prior Publication Data

US 2021/0118449 A1    Apr. 22, 2021

(30) Foreign Application Priority Data

Oct. 16, 2019    (KR) .................. 10-2019-0128148

(51) Int. Cl.
*G10L 15/04*    (2013.01)
*G10L 15/16*    (2006.01)
(Continued)

(52) U.S. Cl.
CPC ............. *G10L 15/32* (2013.01); *G10L 15/16* (2013.01); *G10L 15/22* (2013.01); *G10L 15/04* (2013.01); *G10L 15/26* (2013.01)

(58) Field of Classification Search
CPC .......... G10L 15/22; G10L 15/26; G10L 15/32
See application file for complete search history.

(56) References Cited

U.S. PATENT DOCUMENTS 5,420,810 A * 5/1995 Yamakawa .......... G06K 9/6298
708/322
5,956,681 A * 9/1999 Yamakita ................ G10L 15/26
704/260
(Continued)

FOREIGN PATENT DOCUMENTS

DE    102008024258 A1 * 11/2009    ............. G10L 17/00
KR    10-0825690    4/2008
KR    10-0918644    9/2009

*Primary Examiner* — Daniel C Washburn
*Assistant Examiner* — Oluwadamilola M Ogunbiyi
(74) *Attorney, Agent, or Firm* — Lee, Hong, Degerman, Kang & Waimey PC

(57)    ABSTRACT

Disclosed are a speech processing method and a speech processing apparatus in a 5G communication environment through speech processing by executing embedded artificial intelligence (AI) algorithms and/or machine learning algorithms. The speech processing method includes determining a temporary pause of reception of a first spoken utterance, outputting a first spoken response utterance as a result of speech recognition processing of a second spoken utterance received after the temporary pause, determining, as an extension of the first spoken utterance, a third spoken utterance that is received after outputting the first spoken response utterance, deleting, using a deep neural network model, a duplicate utterance part from a fourth spoken utterance that is obtained by combining the first and the third spoken utterance, and outputting a second spoken response utterance as a result of speech recognition processing of the fourth spoken utterance from which the duplicate utterance part has been deleted.

20 Claims, 6 Drawing Sheets

(51) Int. Cl.
  *G10L 15/22* (2006.01)
  *G10L 15/26* (2006.01)
  *G10L 15/32* (2013.01)

(56) References Cited

U.S. PATENT DOCUMENTS

| | | | |
|---|---|---|---|
| 9,123,339 B1* | 9/2015 | Shaw | G10L 15/22 |
| 10,141,006 B1* | 11/2018 | Burciu | G06F 3/167 |
| 10,559,307 B1* | 2/2020 | Khaleghi | G10L 15/26 |
| 2003/0018531 A1* | 1/2003 | Mahaffy | G06Q 20/20 |
| | | | 705/16 |
| 2005/0137867 A1* | 6/2005 | Miller | G10L 15/26 |
| | | | 704/252 |
| 2012/0215528 A1* | 8/2012 | Nagatomo | G10L 15/22 |
| | | | 704/211 |
| 2013/0325482 A1* | 12/2013 | Tzirkel-Hancock | G10L 21/18 |
| | | | 704/275 |
| 2013/0325484 A1* | 12/2013 | Chakladar | G10L 15/22 |
| | | | 704/275 |
| 2015/0301796 A1* | 10/2015 | Visser | G10L 15/22 |
| | | | 715/728 |
| 2015/0310879 A1* | 10/2015 | Buchanan | G10L 15/04 |
| | | | 704/235 |
| 2017/0200458 A1* | 7/2017 | Kang | G10L 25/87 |
| 2017/0213553 A1* | 7/2017 | Gunn | G06F 1/3265 |
| 2017/0337922 A1* | 11/2017 | Komissarchik | G10L 15/22 |
| 2018/0314689 A1* | 11/2018 | Wang | G10L 15/07 |
| 2019/0042988 A1* | 2/2019 | Brown | G06N 5/022 |
| 2019/0139550 A1* | 5/2019 | Church | G10L 15/26 |
| 2019/0147853 A1* | 5/2019 | Gunasekara | G06N 3/08 |
| | | | 704/243 |
| 2019/0251477 A1* | 8/2019 | Crosta | G06K 9/6267 |
| 2019/0311720 A1* | 10/2019 | Pasko | G10L 15/32 |
| 2019/0341023 A1* | 11/2019 | Ohana | G10L 15/04 |
| 2020/0074996 A1* | 3/2020 | Hamada | G10L 15/22 |
| 2020/0219487 A1* | 7/2020 | Shibuya | G10L 25/78 |
| 2021/0082397 A1* | 3/2021 | Kennewick | G06F 3/167 |
| 2021/0216278 A1* | 7/2021 | D'Amato | G10L 15/22 |

* cited by examiner

SPEECH PROCESSING METHOD AND APPARATUS THEREFOR

CROSS-REFERENCE TO RELATED APPLICATION

Pursuant to 35 U.S.C. § 119(a), this application claims the benefit of earlier filing date and right of priority to Korean Patent Application No. 10-2019-0128148, filed on Oct. 16, 2019, the contents of which are hereby incorporated by reference herein in its entirety.

BACKGROUND

1. Technical Field

The present disclosure relates to a speech processing method and a speech processing apparatus, and more particularly, to a speech processing method and a speech processing apparatus in which a delay that occurs during reception of a spoken utterance is recognized as an incomplete utterance and temporarily stored, a speech recognition processing result for an additional spoken utterance received after the delay is provided, and then a spoken utterance inputted again and a spoken utterance from prior to the delay are recognized as a complete utterance, and a duplicate utterance part is deleted by using a previously trained deep neural network model when executing a speech recognition process on the completed utterance.

2. Description of Related Art

As technology continues to advance, various services using speech recognition technology have been introduced in a number of fields in recent years. Speech recognition technology can be understood as a series of processes of understanding utterances spoken by a speaker and converting the spoken utterance to text data recognizable and usable by computers. Furthermore, speech recognition services using such speech recognition technology may include a series of processes for recognizing a user's spoken utterance and providing a service appropriate thereto.

Korean Patent Registration No. 10-0918644 (registered on Sep. 16, 2009, hereinafter referred to as "related art 1") discloses a conversation system and a conversation sentence generation method for generating conversation sentences through collection and interconnection of actual sentences and words when talking directly to the listener or speaker, and outputting a sentence appropriate to a user's stance and a situation of a conversation partner through a process of correcting and expanding a definition of a word.

Korean Patent Registration No. 10-0825690 (registered on Apr. 22, 2008, hereinafter referred to as "related art 2") discloses a method of correcting a recognition error in a speech recognition system. According to this method, an error included in a result of a speech recognizer can be automatically corrected, and the speech recognizer can be easily adapted to a new area.

In a device (for example, a speech recognition speaker) having the speech recognition functionality of related art 1 or related art 2, a delay may occur while a user makes an utterance towards the device. That is, the user may hesitate due to suddenly not being able to recall a word necessary for completing the utterance, or may search for the word through another route. The device may misrecognize the above delay as completion of the utterance, and may attempt to process the incomplete utterance, resulting in provision of an erroneous speech recognition process result.

During a conversation, it is natural for people to pause for a while and check necessary information before continuing speaking. However, the above-described device is unable to differentiate between a temporary pause in an utterance and completion of an utterance.

The above-described background technology is technical information that the inventors have held for the derivation of the present disclosure or that the inventors acquired in the process of deriving the present disclosure. Thus, the above-described background technology cannot be regarded as known technology disclosed to the general public prior to the filing of the present application.

SUMMARY OF THE INVENTION

An aspect of the present disclosure is to address the shortcoming associated with some related art in which a delay that occurs during an utterance is misrecognized as completion of the utterance, and an attempt to process the incomplete utterance is made, resulting in provision of an erroneous speech recognition process result.

Another aspect of the present disclosure is to address the shortcoming associated with some related art in which a temporary pause in an utterance and completion of an utterance cannot be differentiated.

Another aspect of the present disclosure is to delete, when an additional spoken utterance for obtaining additional information is received during reception of a spoken utterance, a duplicate utterance part when providing a result of speech recognition processing of the spoken utterance and the additional spoken utterance, using a previously trained deep neural network model.

Another aspect of the present disclosure is to address, using optimal process resources, the shortcoming associated with some related art in which a delay that occurs during an utterance is misrecognized as completion of the utterance, and an attempt to process the incomplete utterance is made, resulting in provision of an erroneous speech recognition process result.

Another aspect of the present disclosure is to address, using optimal process resources, the shortcoming associated with some related art in which a temporary pause in an utterance and completion of an utterance cannot be differentiated.

A speech processing method according to an embodiment of the present disclosure may include recognizing a delay that occurs during reception of a spoken utterance as an incomplete utterance and temporarily storing the spoken utterance, providing a result of speech recognition processing of an additional spoken utterance received after the delay, and then recognizing, as a complete utterance, a spoken utterance inputted again and the spoken utterance from prior to the delay, and deleting a duplicate utterance part when performing speech recognition processing on the completed utterance by using a previously trained deep neural network model.

In detail, a speech processing method may include determining a temporary pause of reception of a first spoken utterance during reception of the first spoken utterance, outputting a first spoken response utterance as a result of speech recognition processing of a second spoken utterance received after the temporary pause separately from the first spoken utterance, determining, as an extension of the first spoken utterance, a third spoken utterance received after outputting the first spoken response utterance, deleting, using a deep neural network model previously trained to delete a duplicate utterance part from a spoken utterance, a duplicate utterance part from a fourth spoken utterance that is obtained by combining the first spoken utterance and the third spoken utterance, when performing speech recognition processing on the fourth spoken utterance, and outputting a second spoken response utterance as a result of speech recognition processing of the fourth spoken utterance from which the duplicate utterance part has been deleted.

Through a speech processing method according to an embodiment of the present disclosure, speech recognition processing performance may be improved by recognizing a delay that occurs during reception of a spoken utterance as an incomplete utterance and temporarily storing the spoken utterance, providing a result of speech recognition processing of an additional spoken utterance received after the delay, and then recognizing, as a complete utterance, a spoken utterance inputted again and the spoken utterance from prior to the delay, and deleting a duplicate utterance part by using a previously trained deep neural network model when providing a result of speech recognition processing on the completed utterance.

In addition, the determining a temporary pause of reception of the first spoken utterance may include recognizing a temporary pause signal related to the reception of the first spoken utterance based on a filled pause, as a non-linguistic element, being included in the first spoken utterance during reception of the first spoken utterance, and determining a temporary pause of the reception of the first spoken utterance based on the recognition of the temporary pause signal.

In addition, the recognizing a temporary pause signal related to the reception of the first spoken utterance may include recognizing at least one word in the first spoken utterance, comparing the word with words of a pre-established filled pause dictionary, and recognizing a temporary pause signal related to reception of the first spoken utterance based on a comparison result that the word is the same as a word of the filled pause dictionary.

In addition, determining a temporary pause of reception of the first spoken utterance may include determining the temporary pause of the reception of the first spoken utterance based on a silent delay of a predetermined time occurring during reception of the first spoken utterance.

In addition, determining a temporary pause of reception of the first spoken utterance may include determining the temporary pause of the reception of the first spoken utterance based on a predetermined keyword for determining a temporary pause being included in the first spoken utterance during reception of the first spoken utterance.

In addition, the speech processing method may further include putting speech recognition processing for the first spoken utterance, which was received before the temporary pause, on standby, upon determination of the temporary pause of the reception of the first spoken utterance.

In addition, the deleting a duplicate utterance part from the fourth spoken utterance may include converting the fourth spoken utterance to a fourth text, inputting one or more words included in the fourth text into a word embedding model to obtain a word embedding vector corresponding to each of the one or more words, inputting the word embedding vector into a bidirectional long short term memory (LSTM) model to obtain word feature information including a role and meaning of the word, inputting the word feature information into an attention model to obtain attention information on each of the one or more words, and outputting a result of deleting a duplicate utterance part from the fourth text by using the attention information.

A speech processing apparatus according to another embodiment of the present disclosure may include a first information processor configured to determine a temporary pause of reception of a first spoken utterance during reception of the first spoken utterance, a second information processor configured to output a first spoken response utterance as a result of speech recognition processing of a second spoken utterance received after the temporary pause separately from the first spoken utterance, a third information processor configured to determine, as an extension of the first spoken utterance, a third spoken utterance received after outputting the first spoken response utterance, a fourth information processor configured to delete, using a deep neural network model previously trained to delete a duplicate utterance part from a spoken utterance, a duplicate utterance part from a fourth spoken utterance that is obtained by combining the first spoken utterance and the third spoken utterance, when performing speech recognition processing on the fourth spoken utterance, and a fifth information processor configured to output a second spoken response utterance as a result of speech recognition processing of the fourth spoken utterance from which the duplicate utterance part has been deleted.

Through a speech processing apparatus according to an embodiment of the present disclosure, speech recognition processing performance may be improved by recognizing a delay that occurs during reception of a spoken utterance as an incomplete utterance and temporarily storing the spoken utterance, providing a result of speech recognition processing of an additional spoken utterance received after the delay, and then recognizing, as a complete utterance, a spoken utterance inputted again and the spoken utterance from prior to the delay, and deleting a duplicate utterance part by using a previously trained deep neural network model when providing a result of speech recognition processing on the completed utterance.

In addition, first information processor may be configured to, when determining the temporary pause of the reception of the first spoken utterance, recognize a temporary pause signal related to the reception of the first spoken utterance based on a filled pause, as a non-linguistic element, being included in the first spoken utterance during reception of the first spoken utterance, and determine the temporary pause of the reception of the first spoken utterance based on the recognition of the temporary pause signal.

In addition, the first information processor may be configured to, when recognizing the temporary pause signal related to the reception of the first spoken utterance, recognize at least one word in the first spoken utterance, compare the at least one word with words of a pre-established filled pause dictionary, and recognize a temporary pause signal related to reception of the first spoken utterance based on a comparison result that the word is the same as a word of the filled pause dictionary.

In addition, the first information processor may be configured to, when determining the temporary pause of the reception of the first spoken utterance, determine the temporary pause of the reception of the first spoken utterance based on a silent delay of a predetermined time occurring during reception of the first spoken utterance.

In addition, the first information processor may be configured to, when determining the temporary pause of the reception of the first spoken utterance, determine the temporary pause of the reception of the first spoken utterance based on a predetermined keyword for determining a temporary pause being included in the first spoken utterance during reception of the first spoken utterance.

In addition, the first information processor may be further configured to put speech recognition processing for the first spoken utterance, which was received before the temporary pause, on standby, upon determination of the temporary pause of the reception of the first spoken utterance.

In addition, the fourth information processor may include a converter configured to convert the fourth spoken utterance to a fourth text, a word embedding model configured to output a word embedding model corresponding to each of the one or more words by using one or more words included in the fourth text as an input, a bidirectional long short term memory (LSTM) model configured to output word feature information including a role and meaning of the word by using the word embedding vector as an input, an attention model configured to output attention information on each of the one or more words by using the word feature information as an input, and an output interface configured to output a result of deleting a duplicate utterance part from the fourth text by using the attention information.

The speech processing apparatus according to the present embodiment may include one or more processors and a memory connected to the one or more processors. The memory may store a command that, when executed by a processor, causes the processor to determine a temporary pause of reception of a first spoken utterance during reception of the first spoken utterance, output a first spoken response utterance as a result of speech recognition processing of a second spoken utterance received after the temporary pause, separately from the first spoken utterance, determine, as an extension of the first spoken utterance, a third spoken utterance received after outputting the first spoken response utterance, delete, using a deep neural network model previously trained to delete a duplicate utterance part from a spoken utterance, a duplicate utterance part from a fourth spoken utterance that is obtained by combining the first spoken utterance and the third spoken utterance, when performing speech recognition processing on the fourth spoken utterance, and output a second spoken response utterance as a result of speech recognition processing of the fourth spoken utterance from which the duplicate utterance part has been deleted.

Through a speech processing apparatus according to the present embodiment, speech recognition processing performance may be improved by recognizing a delay that occurs during reception of a spoken utterance as an incomplete utterance and temporarily storing the spoken utterance, providing a result of speech recognition processing of an additional spoken utterance received after the delay, and then recognizing, as a complete utterance, a spoken utterance inputted again and the spoken utterance from prior to the delay, and deleting a duplicate utterance part by using a previously trained deep neural network model when providing a result of speech recognition processing on the completed utterance.

In addition, the command may cause the processor to, when determining the temporary pause of the reception of the first spoken utterance, recognize a temporary pause signal related to the reception of the first spoken utterance based on a filled pause, as a non-linguistic element, being included in the first spoken utterance during reception of the first spoken utterance, and determine the temporary pause of the reception of the first spoken utterance based on the recognition of the temporary pause signal.

In addition, the command may cause the processor to, when recognizing the temporary pause signal related to the reception of the first spoken utterance, recognize at least one word in the first spoken utterance, compare the at least one word with words of a pre-established filled pause dictionary, and recognize a temporary pause signal related to reception of the first spoken utterance based on a comparison result that the word is the same as a word of the filled pause dictionary.

In addition, the command may cause the processor to, when determining the temporary pause of reception of the first spoken utterance, determine a temporary pause of the reception of the first spoken utterance based on a silent delay of a predetermined time occurring during reception of the first spoken utterance.

In addition, the command may cause the processor to convert the fourth spoken utterance to a fourth text, input one or more words included in the fourth text into a word embedding model to obtain a word embedding vector corresponding to each of the one or more words, input the word embedding vector into a bidirectional long short term memory (LSTM) model to obtain word feature information including a role and meaning of the word, input the word feature information into an attention model to obtain attention information on each of the one or more words, and output a result of deleting a duplicate utterance part from the fourth text by using the attention information.

Apart from those described above, another method and another system for implementing the present disclosure, and a computer-readable recording medium having a computer program stored therein to perform the method may be further provided.

Other aspects and features as well as those described above will become clear from the accompanying drawings, the claims, and the detailed description of the present disclosure.

According to the present disclosure, speech recognition processing performance may be improved by recognizing a delay that occurs while receiving a spoken utterance as an incomplete utterance and temporarily storing the spoken utterance, providing a result of speech recognition processing of an additional spoken utterance received after the delay, and then recognizing, as a complete utterance, a spoken utterance inputted again and the spoken utterance from prior to the delay, and deleting a duplicate utterance part by using a previously trained deep neural network model when providing a result of speech recognition processing on the completed utterance.

In addition, speech recognition processing performance may be improved by differentiating a temporary pause of an utterance and completion of an utterance.

In addition, speech recognition processing performance may be improved by providing a result of speech recognition processing of both a spoken utterance and an additional spoken utterance in a state in which a speech recognition functionality is activated even when the additional spoken utterance for obtaining additional information is received while receiving the spoken utterance.

Furthermore, the speech recognition device, in spite of being a mass-produced uniform product, may permit the user to perceive the speech recognition device as a personalized device, thus creating the effect of a customized product.

Also, the present disclosure may increase user satisfaction by providing various services through speech recognition processing, and may perform the speech recognition processing rapidly and accurately.

In addition, voice commands intended by the user may be recognized and processed using only optimal processor resources, thus improving energy efficiency of the speech recognition device.

The effects of the present disclosure are not limited to those mentioned above, and other effects not mentioned may be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
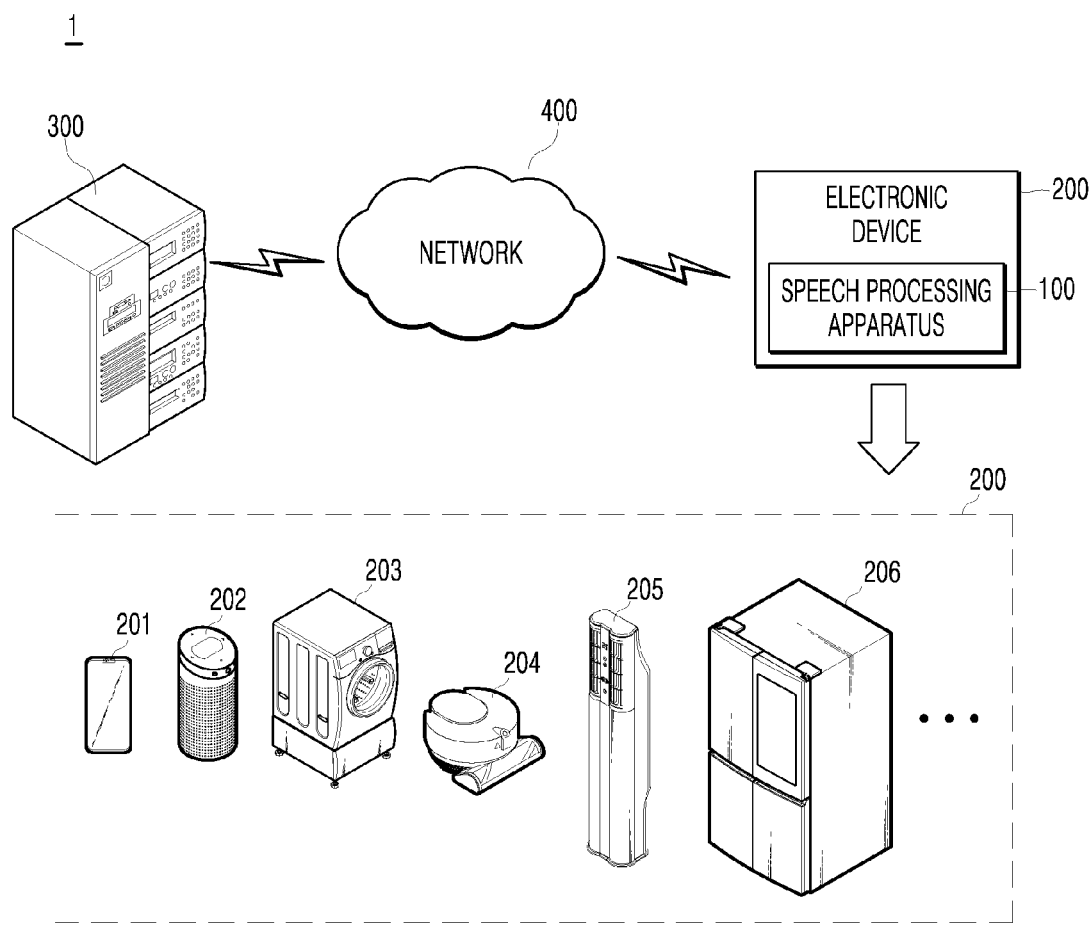
FIG. 1 is an exemplary diagram illustrating a speech processing environment including an electronic device having a speech processing apparatus according to an embodiment of the present disclosure, a server, and a network for connecting the foregoing elements.

The advantages and features of the present disclosure and methods to achieve them will be apparent from the embodiments described below in detail in conjunction with the accompanying drawings. However, the description of particular exemplary embodiments is not intended to limit the present disclosure to the particular exemplary embodiments disclosed herein, but on the contrary, it should be understood that the present disclosure is to cover all modifications, equivalents and alternatives falling within the spirit and scope of the present disclosure. The exemplary embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification if it is determined that such details are not necessary to obtain a complete understanding of the present disclosure.

The terminology used herein is used for the purpose of describing particular exemplary embodiments only and is not intended to be limiting. As used herein, the articles "a," "an," and "the," include plural referents unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, terms such as "first," "second," and other numerical terms may be used herein only to describe various elements, but these elements should not be limited by these terms. These terms are only used to distinguish one element from another.

Hereinafter, embodiments of the present disclosure will be described in detail with reference to the accompanying drawings. Like reference numerals designate like elements throughout the specification, and overlapping descriptions of the elements will be omitted.

FIG. 1 is an exemplary diagram illustrating a speech processing environment including an electronic device having a speech processing apparatus according to an embodiment of the present disclosure, a server, and a network for connecting the foregoing elements. Referring to FIG. 1, the speech processing environment 1 may include an electronic device 200 including a speech processing apparatus 100, a server 300, and a network 400. The electronic device 200 including the speech processing device 100 and the server 300 may be connected to each other in a 5G communication environment.

The speech processing apparatus 100 may receive a spoken utterance from a user and provide a speech recognition service through recognition and analysis of the spoken utterance. Here, the speech recognition service may include receiving utterance information of the user to distinguish a wake-up word and the spoken utterance, and outputting a result of executing a speech recognition process on the utterance information so that the result may be recognized by the user.

In this embodiment, the utterance information may include a wake-up word and an spoken utterance. The wake-up word may be a specific command that activates the speech recognition functionality of the speech processing apparatus 100. The speech recognition functionality is activated only when the wake-up word is present in the spoken utterance, and therefore, when the spoken utterance does not contain the wake-up word, the speech recognition functionality remains in an inactive state (for example, in a sleep mode). Such a wake-up word may be preset and stored in a memory (160 in FIG. 3) that will be described later. Such a wake-up word may be preset and stored in a memory (160 in FIG. 2) that will be described below.

Furthermore, the spoken utterance, which is processed after the speech recognition functionality of the speech processing apparatus 100 is activated by the wake-up word, may include a voice command that may be substantially processed by the speech processing apparatus 100 to generate an output. For example, when the utterance information of the user is "Hi LG, turn on the air conditioner", the wake-up word may be "Hi LG", and the spoken utterance may be "turn on the air conditioner." The speech processing apparatus 100 may determine presence of the wake-up word from the utterance information of the user, and may control an air conditioner 205, as the electronic device 200, by analyzing the spoken utterance.

In the present embodiment, in a state in which the speech recognition functionality is activated after receiving the wake-up word, the speech processing apparatus 100 may determine a temporary pause of reception of a first spoken utterance during reception of the first spoken utterance. The speech processing apparatus 100 may output a first spoken response utterance as a result of speech recognition processing of the second spoken utterance received after the temporary pause, separately from the first spoken utterance. The speech processing apparatus 100 may determine, as an extension of the first spoken utterance, a third spoken utterance received after outputting the first spoken response utterance. When performing the speech recognition processing of a fourth spoken utterance obtained by combining the first spoken utterance and the third spoken utterance, the speech processing apparatus 100 may delete a duplicate utterance part from the fourth spoken utterance using a deep neural network model that is previously trained to delete a duplicate utterance part from a spoken utterance. The speech processing apparatus 100 may output a second spoken response utterance as a result of speech recognition processing of the fourth spoken utterance from which the duplicate utterance part has been deleted.

Here, the first spoken utterance may include a first voice command uttered by the user after uttering the wake-up word, and the first spoken utterance may include an incomplete spoken utterance. For example, referring to FIG. 5, the first spoken utterance may be "in the drama Iris".

The second spoken utterance may include a second voice command uttered after the temporary pause of the first spoken utterance is determined, and the second spoken utterance may include a complete spoken utterance. For example, referring to FIG. 5, the second spoken utterance may be "tell me the cast of the drama Iris".

The third spoken utterance may include a third voice command uttered by the user after the result of speech recognition processing of the second spoken utterance is outputted, and may include an incomplete spoken utterance as a voice command determined as an extension of the first spoken utterance. For example, referring to FIG. 4, the third spoken utterance may be "tell me the role of Kim Tae Hee in the drama Iris".

The fourth spoken utterance may include a complete spoken utterance obtained by combining the incomplete first spoken utterance and the incomplete third spoken utterance. For example, referring to FIG. 4, the fourth spoken utterance may be "in the drama Iris tell me the role of Kim Tae Hee in the drama Iris".

In the present embodiment, a complete spoken utterance may include a voice command (for example, referring to FIG. 4, "tell me the cast of the drama Iris") for which a speech recognition processing result is able to be outputted. Furthermore, an incomplete spoken utterance may include a voice command (for example, referring to FIG. 4, "in the drama Iris") for which a speech recognition processing result is unable to be outputted.

In the present embodiment, upon receiving a voice command, that is, a spoken utterance, from the user after entering a state in which the speech recognition functionality is activated having received the wake-up word from the user, the speech processing apparatus 100 may convert the received spoken utterance into a user text using an acoustic model (not illustrated) and a language model (not illustrated) stored therein. The speech processing apparatus 100 may perform syntactic analysis or semantic analysis on the converted text to recognize an intent of utterance. The speech processing apparatus 100 may generate, on the basis of the intent of utterance, a response text for the user text using a knowledge base. The speech processing apparatus 100 may generate a spoken response utterance as a result of converting the response text, which is a natural language utterance type, into speech. The speech processing apparatus 100 may output the spoken response utterance through an audio output interface (142 of FIG. 2).

In the present embodiment, the speech processing apparatus 100, which is in the speech recognition functionality activated state after having received the wake-up word, may output a speech recognition processing result by executing the speech recognition functionality by itself as described above, or may transmit a spoken utterance to the server 300, and may receive a speech recognition processing result from the server 300 and output the received speech recognition processing result.

In the present embodiment, the speech processing apparatus 100 may be included in the electronic device 200. The electronic device 200 may include various devices compatible with the Internet of things (IoT), such as a user terminal 201, an artificial intelligence speaker 202 serving as a hub for connecting other electronic devices to the network 400, a washing machine 203, a robot cleaner 204, the air conditioner 205, and a refrigerator 206. However, the electronic device 200 is not limited to the examples illustrated in FIG. 1.

The user terminal 201, among such electronic devices 200, may receive a service for driving or controlling the speech processing apparatus 100 through an authentication process after accessing a speech processing apparatus driving application or speech processing apparatus driving site. In the present embodiment, the user terminal 201 that completes the authentication process may drive the speech processing apparatus 100 and control the operation of the speech processing apparatus 100.

In the present embodiment, the user terminal 201 may be a desktop computer, smartphone, notebook, tablet PC, smart TV, mobile phone, personal digital assistant (PDA), laptop, media player, micro-server, global positioning system (GPS) device, electronic book terminal, digital broadcasting terminal, navigation, kiosk, MP3 player, digital camera, home appliance, and other mobile or immobile computing devices which are operated by an user, but is not limited thereto. In addition, the user terminal 201 may be a wearable terminal having a communication function and a data processing function, such as a watch, glasses, a hair band, and a ring. The user terminal 201 is not limited thereto. Any terminal that is capable of performing web browsing may be used without limitation.

The server 300 may be a database server that provides big data required for applying various artificial intelligence algorithms, and data used for operating the speech processing apparatus 100. Furthermore, the server 300 may include a web server or application server for remotely controlling the speech processing apparatus 100 by using a speech processing apparatus driving application or a speech processing apparatus driving web browser installed in the user terminal 201.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of the artificial intelligence into various fields of information technology to solve problems in the respective fields.

Machine learning is an area of artificial intelligence that includes the field of study that gives computers the capability to learn without being explicitly programmed. Specifically, machine learning may be a technology for researching and constructing a system for learning, predicting, and improving its own performance based on empirical data and an algorithm for the same. Machine learning algorithms, rather than only executing rigidly set static program commands, may take an approach that builds models for deriving predictions and decisions from inputted data.

The server 300 may receive, from the speech processing apparatus 100, the fourth spoken utterance that is obtained by combining the first spoken utterance and the third spoken utterance, may generate the second spoken response utterance as a result of speech recognition processing of the fourth spoken utterance, and may then transmit the second spoken response utterance to the speech processing apparatus 100. When transmitting the second spoken response utterance to the speech processing apparatus 100, the server 300 may transmit the second spoken response utterance after deleting a duplicate utterance part therefrom. That is, in the speech recognition processing of the fourth spoken utterance, the server 300 may delete the duplicate utterance part from the fourth spoken utterance using a deep neural network model that is previously trained to delete a duplicate utterance part from a spoken utterance.

Depending on the processing capability of the speech processing apparatus 100, at least some of the generation of the first spoken response utterance and the generation of the second spoken response utterance performed by the server 300 may be performed by the speech processing apparatus 100.

The network 400 may serve to connect the electronic device 200 including the speech processing apparatus 100 and the server 300. The network 400 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network 400 may send and receive information by using the short distance communication and/or the long distance communication. The short distance communication may include Bluetooth®, radio frequency identification (RFID), infrared data association (IrDA), ultra-wideband (UWB), ZigBee, and wireless fidelity (Wi-Fi) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include a connection of network elements such as a hub, a bridge, a router, a switch, and a gateway. The network 400 may include one or more connected networks, for example, a multi-network environment, including a public network such as an Internet and a private network such as a safe corporate private network. Access to the network 400 may be provided through one or more wire-based or wireless access networks. Further, the network 400 may support 5G communications and/or an Internet of things (IoT) network for exchanging and processing information between distributed components such as objects.

Figure 2:
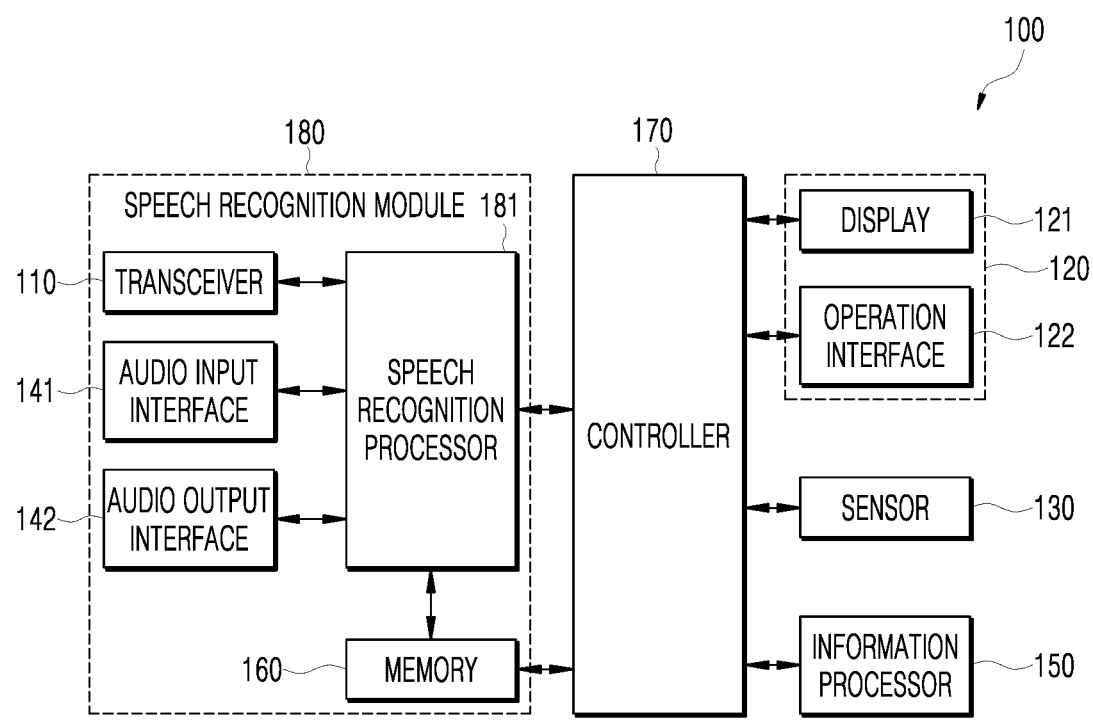
FIG. 2 is a schematic block diagram of a speech processing apparatus according to an embodiment of the present disclosure.

FIG. 2 is a schematic block diagram of a speech processing apparatus according to an exemplary embodiment of the present disclosure. Hereinafter, description overlapping with that of FIG. 1 will be omitted. Referring to FIG. 2, the speech processing apparatus 100 may include transceiver 110, a user interface 120 including a display 121 and an operation interface 122, a sensor 130, an audio processor 140 including an audio input interface 141 and an audio output interface 142, an information processor 150, a memory 160, a controller 170, and a speech recognition processor 181. In this embodiment, the transceiver 110, the audio input interface 141, the audio output interface 142, the memory 160, and the speech recognition processor 181 may be included in the voice recognition module 180.

The transceiver 110 may interwork with the network 400 to provide a communication interface required for providing, in the form of packet data, transmission and reception signals among the speech processing apparatus 100 and/or the electronic device 200 and/or the server 300. Furthermore, the transceiver 110 may receive an information request signal from the electronic device 200, and transmit information processed by the speech processing apparatus 100 to the electronic device 200. Furthermore, the transceiver 110 may transmit the information request signal from the electronic device 200 to the server 300, receive a response signal processed by the server 300, and then transmit the response signal to the electronic device 200. Furthermore, the transceiver 110 may be a device including hardware and software required for transmitting and receiving signals such as a control signal and a data signal via a wired or wireless connection to another network device.

Furthermore, the transceiver 110 may support a variety of object-to-object intelligent communication, for example, Internet of things (IoT), Internet of everything (IoE), and Internet of small things (IoST), and may support, for example, machine to machine (M2M) communication, vehicle to everything (V2X) communication, and device to device (D2D) communication.

The display 121 of the user interface 120 may display a driving state of the speech processing apparatus 100 under control of the controller 170. Depending on the embodiment, the display 121 may form an inter-layer structure with a touch pad so as to be configured as a touch screen. Here, the display 121 may also be used as the operation interface 122 capable of inputting information through a touch of a user. To this end, the display 121 may be configured with a touch-sensitive display controller or other various input and output controllers. As an example, the touch recognition display controller may provide an output interface and an input interface between the device and the user. The touch recognition display controller may transmit and receive electric signals to and from the controller 170. Also, the touch recognition display controller may display a visual output to the user, and the visual output may include text, graphics, images, video, and a combination thereof. The display 121 may be a predetermined display member, such as a touch-sensitive organic light emitting display (OLED), liquid crystal display (LCD), or light emitting display (LED).

The operation interface 122 of the user interface 120 may have a plurality of operation buttons (not shown) to transmit signals corresponding to the buttons to the controller 170. This operation interface 122 may be configured with a sensor, button, or switch structure capable of recognizing a touch or pressing operation of the user. In this embodiment, the operation interface 122 may transmit to the controller 170 an operation signal operated by the user in order to check or modify various information regarding the operation of speech processing apparatus 100 displayed on the display 121.

The sensor 130 may include the image sensor 132 and the proximity sensor 131 configured to sense a condition around the speech processing apparatus 100. The proximity sensor may acquire location data of an object (for example, the user) located around the speech processing apparatus 100 by using infrared rays or the like. Furthermore, the location data of the user acquired by the proximity sensor may be stored in the memory 160.

The image sensor may include a camera (not shown) capable of capturing an image of the surroundings of the speech processing apparatus 100, and for image-capturing efficiency, a plurality of cameras may be installed. For example, each camera may include an image sensor (for example, a CMOS image sensor) which includes at least one optical lens and a plurality of photodiodes (for example, pixels) forming an image using the light passed through the optical lens, and may include a digital signal processor (DSP) for forming an image based on signals outputted from the photodiodes. The digital signal processor may generate not only a static image but also a video formed of frames of static images. The image captured and obtained by the camera serving as the image sensor may be stored in the memory 160.

In this embodiment, the sensor 130 is limited to the proximity sensor and the image sensor, but is not limited thereto. For example, the sensor 130 may include at least one of a lidar sensor, a weight sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor, a microphone, a battery gauge, an environmental sensor (for example, a barometer, a hygrometer, a thermometer, a radiation detection sensor, a heat detection sensor, or a gas detection sensor) and a chemical sensors (for example, an electronic nose, a healthcare sensor, or a biometric sensor). In the present embodiment, the speech processing apparatus 100 may combine various information sensed by at least two of the above-mentioned sensors, and use the combined information.

The audio input interface 141 in the audio processor 140 may receive a spoken utterance uttered by the user (for example, a wake-up word and a voice command) inputted thereto and transmit the same to the controller 170, and the controller 170 may transmit the spoken utterance uttered by the user to the voice recognition module 180. To this end, the audio input interface 141 may be provided with one or more microphones (not illustrated). Furthermore, the audio input interface 131 may be provided with a plurality of microphones (not shown) to more accurately receive a spoken utterance. Here, each of the plurality of microphones may be spaced apart from each other at different positions, and may process the received spoken utterance of the user as an electrical signal.

In some embodiments, the audio input interface 141 may use various noise removing algorithms for removing the noise generated during the process of receiving the spoken utterance. In an alternate embodiment, the audio input interface 141 may include various elements configured to process an audio signal, such as a filter (not shown) configured to remove noise when the user's spoken speech is received, and an amplifier (not shown) configured to amplify and output a signal outputted from the filter.

The audio output interface 142 in the audio processor 140 may output, as audio, an alarm sound, notification messages regarding an operation mode, an operation state, and an error state, information corresponding to a command input of the user, processing results corresponding to a command input of the user, and the like, by a control of the controller 170. The audio output interface 142 may convert electric signals from the controller 170 into audio signals, and output the audio signals. To this end, the audio output interface 142 may be provided with a speaker or the like.

In a state in which the speech recognition functionality is activated after having received the wake-up word, the information processor 150 may determine a temporary pause of reception of the first spoken utterance during reception of the first spoken utterance. The information processor 150 may output the first spoken response utterance as a result of speech recognition processing of the second spoken utterance received after the temporary pause, separately from the first spoken utterance. The information processor 150 may determine, as an extension of the first spoken utterance, the third spoken utterance received after outputting the first spoken response utterance. When performing the speech recognition processing of the fourth spoken utterance obtained by combining the first spoken utterance and the third spoken utterance, the information processor 150 may delete the duplicate utterance part from the fourth spoken utterance using a deep neural network model that is previously trained to delete a duplicate utterance part from a spoken utterance. The information processor 150 may output the second spoken response utterance as a result of speech recognition processing of the fourth spoken utterance from which the duplicate utterance part has been deleted.

In the present embodiment, the information processor 150 may perform training in connection with the controller 170, or may receive training results from the controller 170. In this embodiment, the information processor 150 may be provided outside the controller 170 as illustrated in FIG. 2, or may be provided inside the controller 170 and operate like the controller 170, or may be provided within the server 300 of FIG. 1. Hereinafter, the details of the information processor 150 will be described with reference to FIGS. 3 and 4.

The memory 160 may store therein various information required for operations of the speech processing apparatus 100, and may include a volatile or non-volatile recording medium. For example, the memory 160 may store a preset wake-up word for determining the presence of a wake-up word from the user's spoken utterance. The wake-up word may be set by a manufacturer. For example, "Hi, LG" may be set as the wake-up word, and the user may change the wake-up word. The wake-up word may be inputted in order to activate the speech processing apparatus 100, and the speech processing apparatus 100 that has recognized the wake-up word uttered by the user may switch to a voice recognition activation state.

Furthermore, the memory 160 may store the utterance information (wake-up word and spoken utterance) of the user received via the audio input interface 141, may store information detected by the sensor 130, and may store information processed by the information processor 150.

Furthermore, the memory 160 may store a command to be executed by the information processor 150, for example, a command for determining a temporary pause of reception of the first spoken utterance during reception of the first spoken utterance in a state in which the speech recognition functionality is activated after having received the wake-up word, a command for outputting the first spoken response utterance as a result of speech recognition processing of the second spoken utterance received after the temporary pause separately from the first spoken utterance, a command for determining, as an extension of the first spoken utterance, the third spoken utterance received after outputting the first spoken response utterance, a command for deleting, using a deep neural network model previously trained to delete a duplicate utterance part from a spoken utterance, a duplicate utterance part from the fourth spoken utterance obtained by combining the first spoken utterance and the third spoken utterance, when performing speech recognition processing on the fourth spoken utterance, and a command for outputting the second spoken response utterance as a result of speech recognition processing of the fourth spoken utterance from which the duplicate utterance part has been deleted.

Here, the memory 160 may include a magnetic storage medium or a flash storage medium, but the scope of the present disclosure is not limited thereto. The memory 160 may include a built-in memory and/or an external memory, and may include a volatile memory such as a DRAM, an SRAM, or an SDRAM, a non-volatile memory such as a one-time programmable ROM (OTPROM), a PROM, an EPROM, an EEPROM, a mask ROM, a flash ROM, a NAND flash memory, or a NOR flash memory, a flash drive such as a solid state disk (SSD) compact flash (CF) card, an SD card, a Micro-SD card, a Mini-SD card, an Xd card, or a memory stick, or a storage device such as a HDD.

Here, relatively simple speech recognition may be performed by the speech processing apparatus 100, and relatively complex speech recognition such as natural language processing may be performed by the server 300. For example, when the user utterance word is a preset wake-up word, the speech processing apparatus 100 may switch to a state for receiving a spoken utterance as a speech command. Here, the speech processing apparatus 100 may perform the speech recognition process up to a stage where it is determined whether the wake-up word has been inputted, and the rest of the speech recognition process for the spoken utterance may be performed through the server 300. Since system resources of the speech processing apparatus 100 may be limited, natural language recognition and processing, which are relatively complex, may be performed by the server 300.

The controller 170 may transmit the spoken utterance received via the audio input interface 141 to the speech recognition module 180, and may provide a speech recognition processing result from the speech recognition module 180 as visual information through the display 121 or as auditory information through the audio output interface 142.

The controller 170 may control the entire operation of the speech processing apparatus 100 by driving the control software stored in the memory 160 as a kind of central processing device. The controller 170 may include any type of device capable of processing data, such as a processor. Here, the "processor" may, for example, refer to a data processing device embedded in hardware, which has a physically structured circuitry to perform a function represented by codes or instructions contained in a program. As examples of the data processing device embedded in hardware, a microprocessor, a central processor (CPU), a processor core, a multiprocessor, an application-specific integrated circuit (ASIC), a field programmable gate array (FPGA), and the like may be included, but the scope of the present disclosure is not limited thereto.

In this embodiment, the controller 170 may perform machine learning such as deep learning for the spoken utterance of the user so that the speech processing apparatus 100 output an optimal result of the speech recognition processing. The memory 160 may store, for example, data used in the machine learning and result data.

Deep learning, which is a subfield of machine learning, enables data-based learning through multiple layers. Deep learning may represent a set of machine learning algorithms that extract core data from a plurality of data sets as the number of layers increases.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is widely used in natural language processing and may configure an artificial neural network structure by building up layers at each instant in a structure that is effective for processing time-series data which vary with time. A DBN may include a deep learning structure formed by stacking up multiple layers of restricted Boltzmann machines (RBM), which is a deep learning scheme. When a predetermined number of layers are constructed by repetition of RBM learning, the DBN having the predetermined number of layers may be constructed. A CNN may include a model mimicking a human brain function, which is built under the assumption that when a person recognizes an object, the brain extracts the most basic features of the object and recognizes the object based on the result of complex calculations in the brain.

Meanwhile, learning of an artificial neural network may be performed by adjusting a weight of a connection line (also adjusting a bias value, if necessary) between nodes so that a desired output is achieved with regard to a given input. Also, the artificial neural network may continuously update the weight values through learning. Furthermore, methods such as back propagation may be used in training the artificial neural network.

As described above, the controller 170 may be provided with an artificial neural network and perform machine learning-based user recognition and user's voice recognition using received audio input signals as input data.

The controller 170 may include an ANN, such as a deep neural network (DNN) including a CNN, an RNN, a DBN, and so forth, and may train the DNN. As a machine learning method for such an artificial neural network, both unsupervised learning and supervised learning may be used. The controller 170, after learning according to the setting, may control such that a speech tone recognition artificial neural network structure is updated.

In the present embodiment, the speech recognition module 180 may include a transceiver 110 for transmitting a driving signal and/or various information corresponding to utterance information to the electronic device 200 and/or the server 300, the audio input interface 141 for receiving a spoken utterance, the audio output interface 142 for outputting a speech recognition processing result, and the speech recognition processor 181 for generating the speech recognition result by analyzing a voice command using a speech recognition algorithm.

In the present embodiment, the speech recognition processor 181 may include an automatic speech recognition (ASR) processor (not illustrated), a natural language understanding (NLU) processor (not illustrated), a natural language generation (NLG) processor (not illustrated), and a text-to-speech (TTS) conversion processor (not illustrated).

The automatic speech recognition processor may generate a user text obtained by converting the user's spoken utterance collected through the audio input interface 141 as a microphone into a text. In the present embodiment, the automatic speech recognition processor may perform speech-to-text (STT) conversion. In the present embodiment, the automatic speech recognition processor may include a speech recognizer (not illustrated). The speech recognizer may include an acoustic model and a language model. For example, the acoustic model may include vocalization-related information, and the language model may include unit phoneme information and information about a combination of the unit phoneme information. The speech recognizer may convert the spoken utterance of the user into the user text by using information about the unit phoneme information and the vocalization-related information. Information about the acoustic model and language model may be stored, for example, in an auto speech recognition database (not illustrated) in the auto speech recognition processor.

The natural language understanding processor may analyze an utterance intent of the user spoken utterance by performing syntactic analysis or semantic analysis on the user text. Here, the syntactic analysis may divide a query text into syntactic units (for example, words, phrases, and morphemes), and may identify syntactic elements of the divided units. In addition, the semantic analysis may be performed using semantic matching, rule matching, formula matching, and the like. Accordingly, the natural language understanding processor may recognize the intent of the user text or may acquire a parameter required for expressing the intent.

The natural language generation processor may generate, on the basis of the intent of utterance analyzed by the natural language understanding processor, a response text for the user text using a knowledge base.

The text-to speech conversion processor may generate a spoken response utterance as a result of converting the response text, which is a natural language utterance type and generated by the natural language generation processor, into a spoken utterance, and may output the spoken utterance through the audio output interface 142.

The text-to-speech conversion processor may generate a spoken response utterance as a result of converting the response text, which is a natural language utterance type and generated by the natural language generation processor, into a spoken response utterance, and may output the spoken response utterance through the audio output interface 142.

Figure 3:
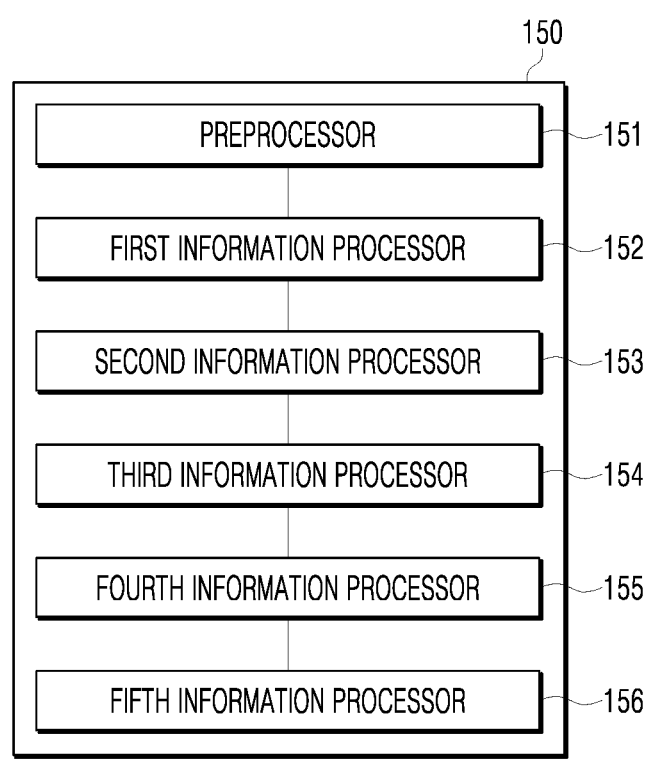
FIG. 3 is a schematic block diagram illustrating an information processor of the speech processing apparatus of FIG. 2 according to an embodiment of the present disclosure.
Figure 4:
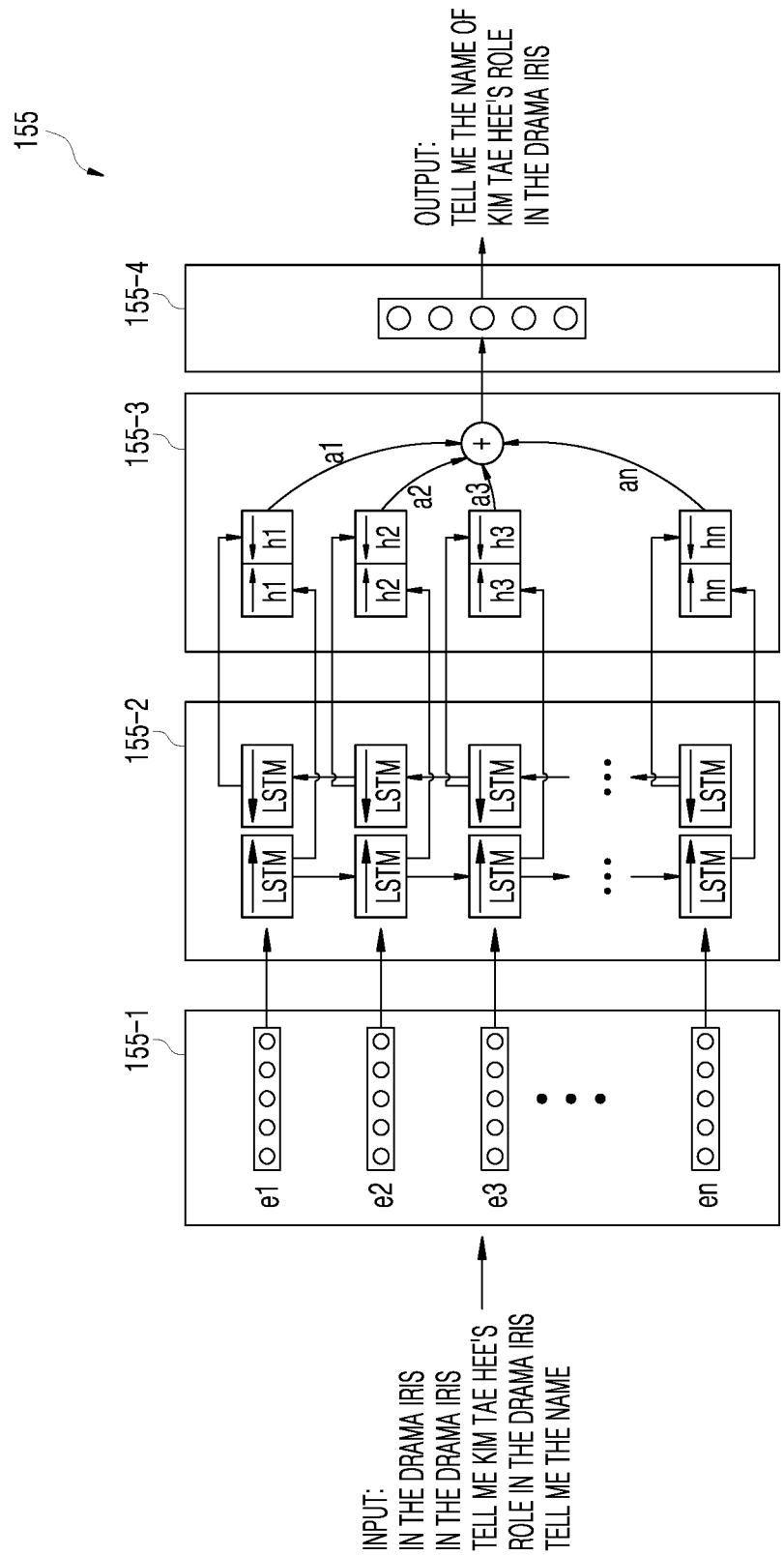
FIG. 4 is a schematic block diagram of a fourth information processor of an information processor of FIG. 2.

FIG. 3 is a schematic block diagram illustrating an information processor of the speech processing apparatus of FIG. 2, and FIG. 4 is a schematic block diagram of a fourth information processor of the information processor of FIG. 2. In the following description, description of parts that are the same as those in FIG. 1 and FIG. 2 will be omitted. Referring to FIG. 3, the information processor 150 may include a preprocessor 151, a first information processor 152, a second information processor 153, a third information processor 154, a fourth information processor 155, and a fifth information processor 156. In an alternative embodiment, the information processor 150 may include one or more processors. In an alternative embodiment, the preprocessor 151 to the fifth information processor 156 may correspond to the one or more processors. In an alternative embodiment, the preprocessor 151 to fifth information processor 156 may correspond to software components configured to be executed by one or more processors. In the present embodiment, the information processor 150 may operate by interworking with the speech traffic module 180.

The preprocessor 151 may initiate a speech recognition activation state of the speech processing apparatus 100 by receiving the wake-up word before receiving the spoken utterance. The preprocessor 151 may convert the wake-up word uttered by the user into text, and may compare the wake-up word with a wake-up word preset in the memory 160 to determine whether the wake-up word uttered by the user is the same as the preset wake-up word. When the wake-up word uttered by the user matches the preset wake-up word as a result of the comparison, the preprocessor 151 may initiate the speech recognition activation state of the speech recognition module 180. When the wake-up word uttered by the user differs from the preset wake-up word as a result of the comparison, the preprocessor 151 may maintain a speech recognition deactivation state of the speech recognition module 180.

After the speech recognition activation state of the speech recognition module 180 is initiated, the first information processor 152 may receive a first spoken utterance through the audio input interface 141. The first information processor 152 may recognize a temporary pause signal related to reception of the first spoken utterance during reception of the first spoken utterance. The first information processor 152 may determine temporary pause of the reception of the first spoken utterance on the basis of the recognition of the temporary pause signal.

Here, the first information processor 152 may determine the temporary pause of the reception of the first spoken utterance in the manner described below. First, when a filled pause, as a non-linguistic element, is included in the first spoken utterance during reception of the first spoken utterance, the first information processor 152 may recognize the temporary pause signal related to the reception of the first spoken utterance, and may determine the temporary pause of the reception of the first spoken utterance on the basis of the recognition of the temporary pause signal. Here, the filled pause represents a meaningless filler word which is used when a person is unable to smoothly continue speaking, and may include, for example, a meaningless syllable or word such as "um", "uh", and the like. The first information processor 152 may recognize at least one word in the first spoken utterance, may compare the at least one word with words of a filled pause dictionary (not illustrated) pre-established in the memory 160, and may determine the recognized word as the temporary pause signal related to the reception of the first spoken utterance when the recognized word is the same as a word of the filled pause dictionary as a result of the comparison.

Second, when a silent delay occurs for a predetermined time (for example, three seconds) during reception of the first spoken utterance, the first information processor 152 may recognize the temporary pause signal related to the reception of the first spoken utterance, and may determine the temporary pause of the reception of the first spoken utterance on the basis of the recognition of the temporary pause signal.

Third, when a predetermined keyword for determining a temporary pause is included in the first spoken utterance while receiving the first spoken utterance, the first information processor 152 may recognize the temporary pause signal related to the reception of the first spoken utterance, and may determine the temporary pause of the reception of the first spoken utterance on the basis of the recognition of the temporary pause signal. Here, the memory 160 may store keywords for determining a temporary pause, such as "just a moment". The first information processor 152 may recognize at least one word in the first spoken utterance, may compare the at least one word with the keywords for determining a temporary pause stored in the memory 160, and may determine the recognized word as the temporary pause signal related to the reception of the first spoken utterance when the recognized word is the same as the keyword for determining a temporary pause as a result of the comparison.

Upon determination of the temporary pause of the reception of the first spoken utterance, the first information processor 152 may put speech recognition processing for the first spoken utterance, which was received before the temporary pause, on standby, and may temporarily store the first spoken utterance in the memory 160. When the first information processor 152 determines the temporary pause of the reception of the first spoken utterance, the first information processor 152 may determine that there is an additional spoken utterance (second spoken utterance) requiring reception of a speech recognition processing result, in addition to the first spoken utterance. That is, the speech recognition processing for the first spoken utterance, which is processed by the first information processor 152, may be put on standby from after determination of the temporary pause of the first spoken utterance until the second information processor 153 receives the second spoken utterance.

When the first information processor 152 determines the temporary pause of the first spoken utterance, the second information processor 153 may receive the second spoken utterance, which is received after the temporary pause separately from the first spoken utterance, and may output a first spoken response utterance as a result of speech recognition processing of the second spoken utterance. After the temporary pause of the first spoken utterance, the second information processor 153 may transmit, to the speech recognition module 180, the second spoken utterance as an additional spoken utterance received via the audio input interface 141, and may receive the first spoken response utterance as a result of speech recognition processing from the speech recognition module 180, and output the first spoken response utterance through the audio output interface 142.

Here, the second information processor 153 may maintain a speech recognition activation state even after outputting a result of speech recognition processing of the second spoken utterance. A typical speech recognition processing apparatus maintains a speech recognition deactivation state until a next wake-up word is received after outputting a result of speech recognition processing of a spoken utterance. Here, according to the present embodiment, the speech recognition activation state may be maintained even after outputting a result of speech recognition processing of the second spoken utterance. This is because a spoken utterance (third spoken utterance) received after outputting a result of speech recognition processing of the additional spoken utterance (second spoken utterance) is determined to be an extension of the first spoken utterance. In more detail, the speech recognition activation state may be maintained until the fourth information processor 155 outputs a second spoken response utterance as a result of speech recognition processing of a fourth spoken utterance after the second information processor 153 outputs a result of speech recognition processing of the second spoken utterance.\

After the second information processor 153 outputs the first spoken response utterance as a result of speech recognition processing of the second spoken utterance, the third spoken utterance received by the third information processor 154 via the audio input interface 141 may be determined to be an extension of the first spoken utterance.

The fourth information processor 155 may generate the fourth spoken utterance, which is obtained by combining the first spoken utterance temporarily stored in the memory 160 and the third spoken utterance received by the third information processor 154. When performing speech recognition processing on the fourth spoken utterance, the information processor 155 may delete a duplicate utterance part from the fourth spoken utterance. The fourth information processor 155 may delete the duplicate utterance part from the fourth spoken utterance using a deep neural network model that is previously trained to delete a duplicate utterance part from a spoken utterance. In the present embodiment, the deep neural network model may include a model combining a word embedding model and a bidirectional LSTM model attention model.

Referring to FIG. 4, the fourth information processor 155 may include a word embedding model 155-1, a bidirectional LSTM model 155-2, an attention model 155-3, and an output unit 155-4. Although not shown in the drawing, the fourth information processor 155 may further include a converter for converting the fourth spoken utterance into the fourth text.

Using one or more words included in the fourth text as an input, the word embedding model 155-1 may output a word embedding vector corresponding to each of the one or more words. The word embedding model 155-1 may obtain a vector of each word by learning in a manner of mapping to points close to each other with respect to words that are semantically similar to each other. This word embedding model 155-1 may be implemented using, for example, word2vec, glove, and fastText.

Here, word embedding is a representative method of representing a word as a vector, and may mainly mean converting a sparse representation into a dense representation. For example, in the One-Hot-Vector generated through One-Hot-Encoding, an index value of a word to be expressed is 1, and the remaining index values may be expressed as 0. In this way, a method in which most values of a vector or a matrix are represented by 0 may be referred to as a sparse representation. In contrast, a dense representation may have real values other than 0 and 1, and may densify the dimensions of the vector. Word embedding represents a word in the form of a dense vector, and a vector generated through a word embedding scheme may be expressed as a word embedding vector.

Using a word embedding vector as an input, the bidirectional long short term memory (LSTM) model 155-2 may output word feature information including a role and meaning of a word. The bidirectional LSTM model 155-2 may extract the left context through forward progress and the right context through backward progress with respect to the inputted word embedding vector, and may then combine the extracted left context and right context to generate word feature information including the role and meaning of the word.

The LSTM model has a structure in which a cell-state is added to a hidden state of an existing recurrent neural network (RNN) model. The added cell-state may act as a kind of conveyor belt, such that the gradient may propagate well to the state even after a long time passes. The LSTM model has a circular structure like the RNN model, but unlike the RNN model, which has a single neural network layer, the LSTM model may have a structure that uses a special method that allows four interactions. In addition, the LSTM model may be configured to include a cell-state that goes through a minor computation process and goes through the entire chain, a gate that allows information to optionally enter the cell-state, and a sigmoid layer that determines the degree of influence of each component. At this time, the sigmoid layer outputs values of 0 and 1. A value of 0 causes the corresponding component to have no influence on future results, while a value of 1 may cause data to flow in order to allow the corresponding component to influence future prediction results. The gate may be configured with a sigmoid or tanh function.

In addition, the LSTM model may output a result value through changing and remembering or forgetting the value of the cell state, determining what information is contained in the cell state, and determining what value to output. In the changing and remembering or forgetting of the cell state, the LSTM models may have a forget gate layer that determines whether to forget or take the cell state values. The forget gate layer sees the input value, and causes the input value to acquire a value between 0 and 1 by passing it through the sigmoid function so as to determine whether to forget or take the cell state value. In the determining of what information is contained in the cell state, the sigmoid layer, called the input gate layer, determines which values to update, and the tanh layer generates some candidate values and multiplies two generated values so that it may determine what information is contained in the cell state. In the determining of which value to output, a value between −1 and 1 may be obtained by applying tanh to the cell state, and a value obtained by multiplying the activation value from the inputted value by the value from the tanh layer may be outputted.

Using word feature information as an input, the attention model 155-3 may output word information on one or more words. The attention model 155-3 may represent a model for generating attention information corresponding to the word feature information by using a pre-trained neural network. Here, the attention information may be information indicating which word of the fourth text outputted after the decoding process should be weighted.

Using, as an input, the encoding generated by using the hidden state of the encoder and the hidden state of the decoder generated so far in an RNN encoder-decoder model, the attention model 155-3 may determine which locations (which words) in the input should be watched carefully. The attention model 155-3 may allocate higher weights (attention information) to positions (words) to be watched carefully. That is, the attention model 155-3 may output different attention information for each word depending on whether the word in a position has played an important role in generating the current output.

Using the attention information, the output interface 155-4 may output a result of deleting the duplicate utterance part from the fourth text. In the present embodiment, the output interface 155-4 may correspond to the decoder described above. That is, the output interface 155-4 may select a word having high attention information from the fourth text, and output a labeled answer corresponding to the selected word. In the duplicate utterance part, that is, duplicate words, the attention information may be the same, or the attention information of one word may be lower than the attention information of another word.

Returning to FIG. 3, the fifth information processor 156 may output a second spoken response utterance as a result of speech recognition processing of the fourth spoken utterance from which the duplicate utterance part has been deleted. In the conventional case, for example, in the case illustrated in FIG. 4, the wording of "in the drama Iris the role of Kim Tae Hee is Seung Hee in the drama Iris" is generated as the second spoken response utterance for the fourth spoken utterance of "in the drama Iris tell me the role of Kim Tae Hee in the drama Iris", and thus the duplicate utterance part "in the drama Iris" is present. However, according to the present embodiment, the wording "the role of Kim Tae Hee is Seung Hee in the drama Iris" is generated as the second spoken response utterance. Thus, since there is no duplicate utterance part, the spoken response utterance sounds more natural to the user, and speech recognition processing performance may be improved.

In the present embodiment, the information processor 150 and/or the controller 170 may obtain a filled pause time interval, a silent delay time interval, and a keyword time interval, and may determine a temporary pause interval from the user's spoken utterance using a deep neural network pre-trained to determine a temporary pause.

Figure 5:
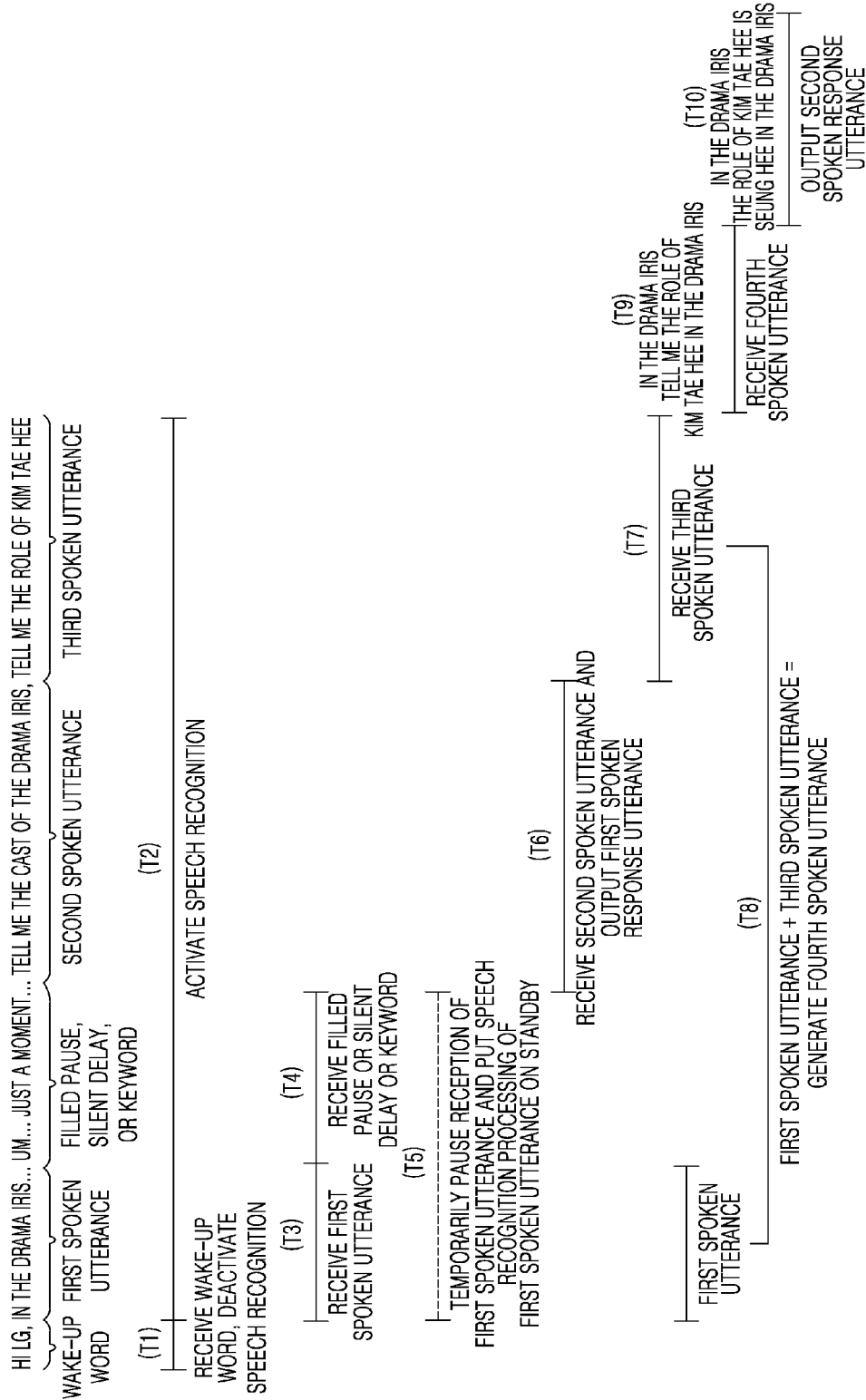
FIG. 5 is an exemplary diagram illustrating operation of an information processor for processing a user's spoken utterance according to an embodiment of the present disclosure.

FIG. 5 is an exemplary diagram illustrating operation of a processor for processing a user's spoken utterance according to an embodiment of the present disclosure. Hereinafter, description overlapping with that of FIGS. 1 to 4 will be omitted. Referring to FIG. 5, it is assumed that the user's spoken utterance is "Hi LG, in the drama Iris . . . um . . . just a moment . . . tell me the cast of the drama Iris, tell me the role of Kim Tae Hee".

First, upon receiving the user's spoken utterance "Hi, LG" during a time T1, the information processor 150 may initiate the speech recognition activation state of the information processing apparatus 100 during a time T2.

The information processor 150 may receive the user's spoken utterance "in the drama Iris" (first spoken utterance) during a time T3, and thereafter may receive " . . . um . . . just a moment . . . " during a time T4. Here, " . . . um . . . just a moment . . . " may be a filled pause and temporary pause keyword, through which the temporary pause of the first spoken utterance may be determined.

During a time T5, the information processor 150 may temporarily pause the first spoken utterance, and may temporarily store the first spoken utterance ("in the drama Iris") from prior to the temporary pause in the memory 160, and may set a speech recognition processing standby state.

After temporarily storing the first spoken utterance ("in the drama Iris") from prior to the temporary pause in the memory 160, during a time T6, the information processor 150 may receive the user's spoken utterance "tell me the cast of the drama Iris" (second spoken utterance), and may output a first spoken response utterance, for example, "the cast of Iris is Lee Byung Hun, Kim Tae Hee, . . . etc.", as a result of speech recognition processing of the second spoken utterance.

The information processor 150 may maintain the speech recognition activation state after outputting the first spoken response utterance, and upon receiving the user's spoken utterance "tell me the role of Kim Tae Hee in the drama Iris" (third spoken utterance) during a time T7, the information processor 150 may generate, during a time T8, a fourth spoken utterance ("in the drama Iris tell me the role of Kim Tae Hee in the drama Iris") by combining the first spoken utterance stored in the memory 160 and the third spoken utterance received during the time T7. Here, the information processor 150 may determine that the third spoken utterance is an extension of the first spoken utterance.

During a time T9, the information processor 150 may receive the fourth spoken utterance ("in the drama Iris tell me the role of Kim Tae Hee in the drama Iris") generated by combining the first spoken utterance and the third spoken utterance.

During a time T10, when performing speech recognition processing on the fourth spoken utterance, the duplicate utterance part ("in the drama Iris") in the fourth spoken utterance may be deleted using a deep neural network model that is previously trained to delete a duplicate utterance part from a spoken utterance, and a second spoken response utterance, for example, "the role of Kim Tae Hee is Seung Hee in the drama Iris", may be outputted as a result of speech recognition processing of the fourth spoken utterance from which the duplicate utterance part has been deleted.

Figure 6:
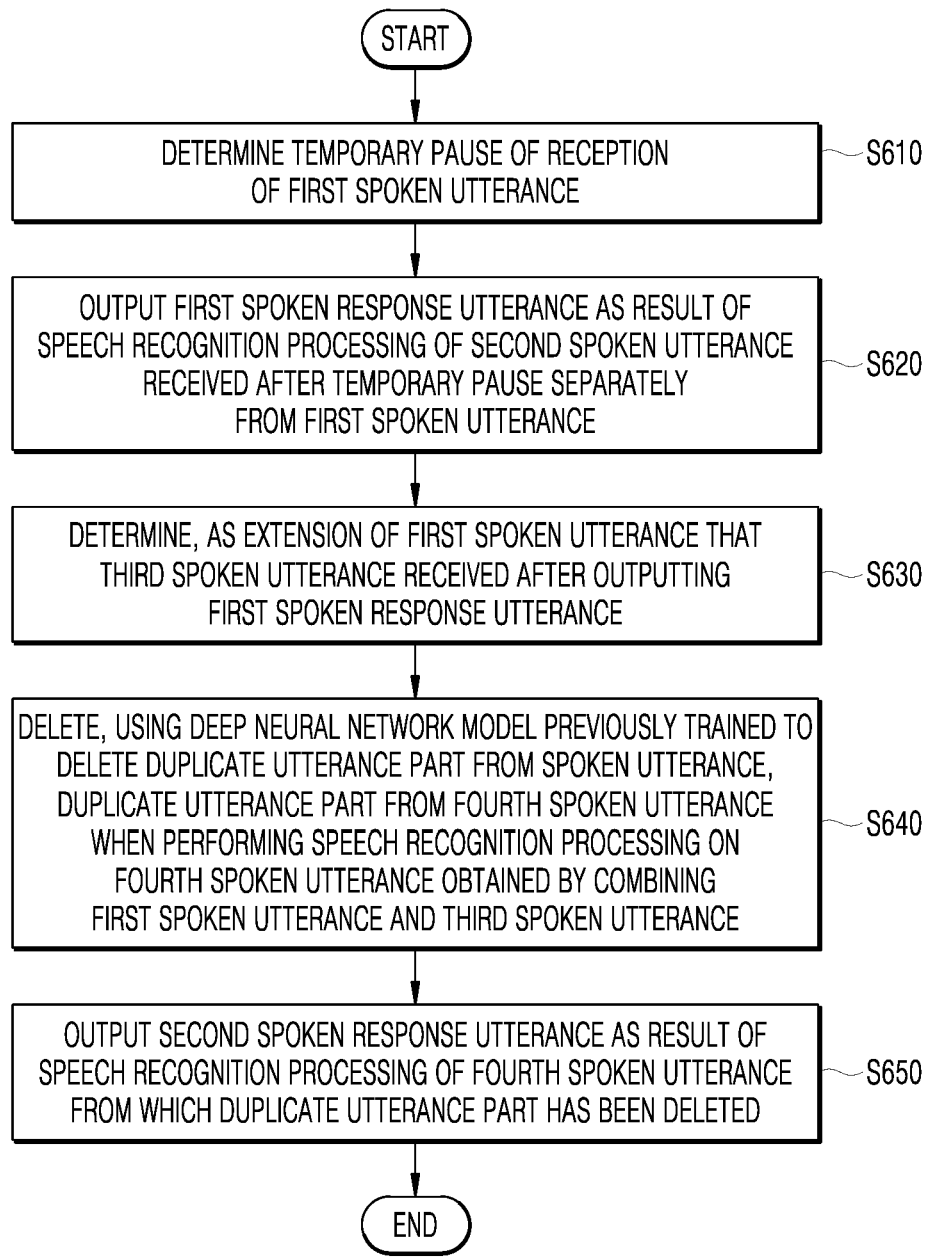
FIG. 6 is a flowchart illustrating a speech processing method according to an embodiment of the present disclosure.

FIG. 6 is a flowchart of a speech processing method according to an exemplary embodiment of the present disclosure. Hereinbelow, description overlapping with that of FIG. 1 through FIG. 5 will be omitted.

Referring to FIG. 6, in operation S610, the speech processing apparatus 100 receives a first spoken utterance as a first voice command via the audio input interface 141 after initiating a speech recognition activation state by receiving a wake-up word, recognizes a temporary pause signal related to reception of the first spoken utterance during reception of the first spoken utterance, and determines the temporary pause of the first spoken utterance based on the recognition of the temporary pause signal. In the present embodiment, when a filled pause, as a non-linguistic element, is included in the first spoken utterance during reception of the first spoken utterance, the speech processing apparatus 100 may determine the temporary pause of the reception of the first spoken utterance. Furthermore, when a silent delay occurs for a predetermined time (for example, three seconds) during reception of the first spoken utterance, the speech processing apparatus 100 may determine the temporary pause of the reception of the first spoken utterance. Furthermore, when the predetermined keyword for determining a temporary pause is included in the first spoken utterance while receiving the first spoken utterance, the speech processing apparatus 100 may determine the temporary pause of the reception of the first spoken utterance. Upon determination of the temporary pause of the reception of the first spoken utterance, the speech processing apparatus 100 may put the speech recognition processing for the first spoken utterance, which was received before the temporary pause, on standby, and may temporarily store the first spoken utterance in the memory 160. When the speech processing apparatus 100 determines the temporary pause of the reception of the first spoken utterance, the speech processing apparatus may determine that there is an additional spoken utterance (second spoken utterance) requiring reception of a speech recognition processing result, in addition to the first spoken utterance. That is, the speech recognition processing for the first spoken utterance, which is processed by the speech processing apparatus 100, may be put on standby from after the determining of the temporary pause of the first spoken utterance until the receiving of the second spoken utterance.

In operation S620, when the speech processing apparatus 100 determines the temporary pause of the first spoken utterance, the speech processing apparatus 100 receives the second spoken utterance, which is received after the temporary pause separately from the first spoken utterance, and outputs a first spoken response utterance as a result of speech recognition processing of the second spoken utterance. Here, the speech processing apparatus 100 may maintain the speech recognition activation state even after outputting the first spoken response utterance. A typical speech recognition processing apparatus maintains a speech recognition deactivation state until a next wake-up word is received after outputting a result of speech recognition processing of a spoken utterance. However, in the present embodiment, the speech recognition activation state may be maintained even after outputting a result of speech recognition processing of the second spoken utterance. This is because a spoken utterance (third spoken utterance) received after outputting a result of speech recognition processing of the additional spoken utterance (second spoken utterance) is determined to be an extension of the first spoken utterance.

In operation S630, the speech processing apparatus 100 determines, as an extension of the first spoken utterance, a third spoken utterance received after outputting the first spoken response utterance.

In operation S640, the speech processing apparatus 100 generates a fourth spoken utterance that is obtained by combining the first spoken utterance stored temporarily in the memory 160 and the received third spoken utterance, and deletes a duplicate utterance part from the fourth spoken utterance using a deep neural network model previously trained to delete a duplicate utterance part from a spoken utterance, when performing speech recognition processing on the fourth spoken utterance. The speech processing apparatus 100 may convert the fourth spoken utterance into a fourth text. The speech processing apparatus 100 may input one or more words included in the fourth text into a word embedding model to obtain a word embedding vector corresponding to each of the one or more words. The speech processing apparatus 100 may input the word embedding vector into a bidirectional LSTM model to obtain word feature information including the role and meaning of words. The speech processing apparatus 100 may obtain word information on each of one or more words by inputting word feature information into an attention model. The speech processing apparatus 100 may output a result of deleting the duplicate utterance part from the fourth text by using the attention information.

In operation S650, the speech processing apparatus 100 outputs a second spoken response utterance as a result of speech recognition processing of the fourth spoken utterance from which the duplicate utterance part has been deleted.

Embodiments according to the present disclosure described above may be implemented in the form of computer programs that may be executed through various components on a computer, and such computer programs may be recorded in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. A speech processing method comprising:
    determining a temporary pause of reception of a first spoken utterance during reception of the first spoken utterance;
    outputting a first spoken response utterance as a result of speech recognition processing of a second spoken utterance received after the temporary pause, separately from the first spoken utterance;
    determining, as an extension of the first spoken utterance, a third spoken utterance received after outputting the first spoken response utterance;
    deleting, using a deep neural network model previously trained to determine a duplicate utterance part from a spoken utterance, a duplicate utterance part from a fourth spoken utterance that is obtained by combining the first spoken utterance and the third spoken utterance; and
    outputting a second spoken response utterance as a result of speech recognition processing of the fourth spoken utterance from which the duplicate utterance part has been deleted.

2. The method of claim 1, further comprising:
    recognizing a temporary pause signal related to the reception of the first spoken utterance based on filled pause, as a non-linguistic element, being included in the first spoken utterance during reception of the first spoken utterance; and
    wherein the temporary pause of reception of the first spoken utterance is determined based on the recognition of the temporary pause signal.

3. The method of claim 2, further comprising:
    recognizing at least one word in the first spoken utterance; and
    comparing the at least one word with words of a pre-established filled pause dictionary; and
    wherein the temporary pause signal related to reception of the first spoken utterance is determined based on a comparison result that the word is the same as a word of the filled pause dictionary.

4. The method of claim 1, wherein the temporary pause of reception of the first spoken utterance is determined based on a silent delay of a predetermined time occurring during reception of the first spoken utterance.

5. The method of claim 1, wherein the temporary pause of reception of the first spoken utterance is determined based on a predetermined keyword for determining a temporary pause being included in the first spoken utterance during reception of the first spoken utterance.

6. The method of claim 1, further comprising putting on standby speech recognition processing for the first spoken utterance received before the temporary pause upon determination of the temporary pause of the reception of the first spoken utterance.

7. The method of claim 1, wherein the deleting a duplicate utterance part from the fourth spoken utterance comprises:
    converting the fourth spoken utterance to a fourth text;
    inputting one or more words included in the fourth text into a word embedding model to obtain a word embedding vector corresponding to each of the one or more words;
    inputting the word embedding vector into a bidirectional long short term memory (LSTM) model to obtain word feature information including a role and meaning of the word;
    inputting the word feature information into an attention model to obtain attention information on each of the one or more words; and
    outputting a result of deleting a duplicate utterance part from the fourth text by using the attention information.

8. A non-transitory computer-readable recording medium on which a computer program for executing the method according to claim 1 using a computer is stored.

9. A speech processing apparatus comprising one or more processors configured to:
    determine a temporary pause of reception of a first spoken utterance during reception of the first spoken utterance;
    output a first spoken response utterance as a result of speech recognition processing of a second spoken utterance received after the temporary pause, separately from the first spoken utterance;
    determine, as an extension of the first spoken utterance, a third spoken utterance received after outputting the first spoken response utterance;
    delete, using a deep neural network model previously trained to determine a duplicate utterance part from a spoken utterance, a duplicate utterance part from a fourth spoken utterance that is obtained by combining the first spoken utterance and the third spoken utterance; and
    output a second spoken response utterance as a result of speech recognition processing of the fourth spoken utterance from which the duplicate utterance part has been deleted.

10. The speech processing apparatus of claim 9, wherein the one or more processors are further configured to recognize a temporary pause signal related to the reception of the first spoken utterance based on a filled pause, as a non-linguistic element, being included in the first spoken utterance during reception of the first spoken utterance, wherein the temporary pause of reception of the first spoken utterance is determined based on the recognition of the temporary pause signal.

11. The speech processing apparatus of claim 9, wherein the one or more processors are further configured to recognize at least one word in the first spoken utterance, and compare the at least one word with words of a pre-established filled pause dictionary, wherein the temporary pause signal related to reception of the first spoken utterance is determined based on a comparison result that the word is the same as a word of the filled pause dictionary.

12. The speech processing apparatus of claim 9, wherein the temporary pause of reception of the first spoken utterance is determined based on a silent delay of a predetermined time occurring during reception of the first spoken utterance.

13. The speech processing apparatus of claim 9, wherein the temporary pause of reception of the first spoken utterance is determined based on a predetermined keyword for determining a temporary pause being included in the first spoken utterance during reception of the first spoken utterance.

14. The speech processing apparatus of claim 9, wherein the one or more processors are further configured to, upon determination of the temporary pause of the reception of the first spoken utterance, put on standby speech recognition processing for the first spoken utterance received before the temporary pause.

15. The speech processing apparatus of claim 9, wherein the one or more processors are further configured to:
- convert the fourth spoken utterance to a fourth text;
- output a word embedding model corresponding to each of the one or more words by using one or more words included in the fourth text as an input to a word embedding model;
- output word feature information including a role and meaning of the word by using the word embedding vector as an input to a bidirectional long short term memory (LSTM) model;
- output attention information on each of the one or more words by using the word feature information as an input to an attention model; and
- output a result of deleting a duplicate utterance part from the fourth text by using the attention information.

16. A speech processing apparatus comprising:
- one or more processors; and
- a memory connected to the one or more processors,
- wherein the memory stores instructions that, when executed by the one or more processors, causes the one or more processors to:
- determine a temporary pause of reception of a first spoken utterance during reception of the first spoken utterance;
- output a first spoken response utterance as a result of speech recognition processing of a second spoken utterance received after the temporary pause, separately from the first spoken utterance;
- determine, as an extension of the first spoken utterance, a third spoken utterance received after outputting the first spoken response utterance;
- delete, using a deep neural network model previously trained to determine a duplicate utterance part from a spoken utterance, a duplicate utterance part from a fourth spoken utterance that is obtained by combining the first spoken utterance and the third spoken utterance; and
- output a second spoken response utterance as a result of speech recognition processing of the fourth spoken utterance from which the duplicate utterance part has been deleted.

17. The speech processing apparatus of claim 16, wherein execution of the stored instructions further causes the one or more processors to recognize a temporary pause signal related to reception of the first spoken utterance based on a filled pause, as a non-linguistic element, being included in the first spoken utterance during reception of the first spoken utterance, wherein the temporary pause of the reception of the first spoken utterance is determined based on the recognition of the temporary pause signal.

18. The speech processing apparatus of claim 16, wherein execution of the stored instructions further causes the one or more processors to recognize at least one word in the first spoken utterance, and compare the at least one word with words of a pre-established filled pause dictionary, wherein the temporary pause signal related to reception of the first spoken utterance is determined based on a comparison result that the word is the same as a word of the filled pause dictionary.

19. The speech processing apparatus of claim 16, wherein the temporary pause of reception of the first spoken utterance is determined based on a silent delay of a predetermined time occurring during reception of the first spoken utterance.

20. The speech processing apparatus of claim 16, wherein execution of the stored instructions further causes the one or more processors to:
- convert the fourth spoken utterance to a fourth text;
- input one or more words included in the fourth text into a word embedding model to obtain a word embedding vector corresponding to each of the one or more words;
- input the word embedding vector into a bidirectional long short term memory (LSTM) model to obtain word feature information including a role and meaning of the word;
- input the word feature information into an attention model to obtain attention information on each of the one or more words; and
- output a result of deleting a duplicate utterance part from the fourth text by using the attention information.

* * * * *